(12) United States Patent
Gunderson

(10) Patent No.: US 8,939,470 B2
(45) Date of Patent: Jan. 27, 2015

(54) QUICK CONNECTOR FOR HIGH PRESSURE APPLICATIONS

(76) Inventor: Stephen H. Gunderson, Marine City, MI (US)

( * ) Notice: Subject to any disclaimer, the term of this patent is extended or adjusted under 35 U.S.C. 154(b) by 574 days.

(21) Appl. No.: 12/048,947

(22) Filed: Mar. 14, 2008

(65) Prior Publication Data

US 2008/0231044 A1 Sep. 25, 2008

Related U.S. Application Data

(60) Provisional application No. 60/895,925, filed on Mar. 20, 2007.

(51) Int. Cl.
*F16L 35/00* (2006.01)
*F16L 37/098* (2006.01)

(52) U.S. Cl.
CPC ......... *F16L 37/0987* (2013.01); *F16L 2201/10* (2013.01)
USPC .................. 285/81; 285/39; 285/93; 285/319

(58) Field of Classification Search
USPC ............. 285/39, 81, 82, 86, 87, 93, 308, 314, 285/315, 319, 321, 322, 323, 330, 913
See application file for complete search history.

(56) References Cited

U.S. PATENT DOCUMENTS

| | | | |
|---|---|---|---|
| 4,681,351 A | 7/1987 | Bartholomew | |
| 4,846,506 A | 7/1989 | Bocson et al. | |
| 4,905,964 A * | 3/1990 | Shiozaki | 251/149.6 |
| 4,915,420 A | 4/1990 | Washizu | |
| 4,948,175 A | 8/1990 | Bartholomew | |
| 4,948,176 A | 8/1990 | Bartholomew | |
| 5,067,754 A | 11/1991 | Bartholomew | |
| 5,160,177 A * | 11/1992 | Washizu | 285/319 |
| 5,178,424 A * | 1/1993 | Klinger | 285/319 |
| 5,228,728 A * | 7/1993 | McNaughton et al. | 285/319 |
| 5,257,833 A | 11/1993 | McNaughton et al. | |
| 5,413,387 A | 5/1995 | Bartholomew | |
| 5,423,577 A | 6/1995 | Ketcham | |
| 5,429,395 A * | 7/1995 | Ketcham | 285/87 |
| 5,441,313 A * | 8/1995 | Kalahasthy | 285/93 |
| 5,478,046 A * | 12/1995 | Szabo | 251/149.6 |
| 5,486,025 A | 1/1996 | Ketcham | |
| 5,538,297 A | 7/1996 | McNaughton et al. | |
| 5,542,717 A | 8/1996 | Rea et al. | |

(Continued)

FOREIGN PATENT DOCUMENTS

EP 1 635 104 3/2006

*Primary Examiner* — Daniel P Stodola
*Assistant Examiner* — Gwendolyn Driggers
(74) *Attorney, Agent, or Firm* — Leydig, Voit & Mayer, Ltd.

(57) ABSTRACT

A quick connector coupling assembly includes a retainer to connect a rigid tube to a hollow body component. A sleeve extending between a fluid sealing member and the retainer includes a rearward abutment surface in abutting contact with the retainer. The retainer locking arms include forward abutment surfaces in abutting relation with the tube upset and forward abutment surfaces in abutting relation with the sleeve. An insertion verifier includes a ring portion with axially extending legs positioned in the slots between the retainer locking arms. At least one leg includes a releasable latch engaged with the retainer in the slots between the locking arms. Guide elements on the retainer and insertion verifier align the verifier legs and retainer slots on insertion of the verifier.

8 Claims, 5 Drawing Sheets

(56) References Cited

U.S. PATENT DOCUMENTS

| | | | |
|---|---|---|---|
| 5,593,188 A * | 1/1997 | McNaughton et al. | 285/319 |
| 5,626,371 A | 5/1997 | Bartholomew | |
| 5,752,726 A | 5/1998 | Fixemer | |
| 5,785,358 A * | 7/1998 | Kujawski et al. | 285/93 |
| 5,882,048 A * | 3/1999 | Kawasaki et al. | 285/319 |
| 6,079,750 A | 6/2000 | Kacines | |
| 6,173,994 B1 * | 1/2001 | Ketcham | 285/45 |
| 6,279,966 B1 | 8/2001 | Kondo et al. | |
| 6,497,433 B1 | 12/2002 | Ketcham | |
| 6,866,304 B2 | 3/2005 | Kaminski et al. | |
| 2006/0061096 A1 | 3/2006 | Krause et al. | |
| 2006/0082149 A1 | 4/2006 | Gunderson | |
| 2007/0052232 A1 | 3/2007 | Gunderson | |

* cited by examiner

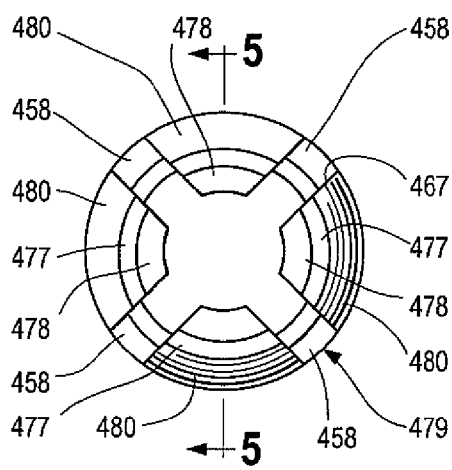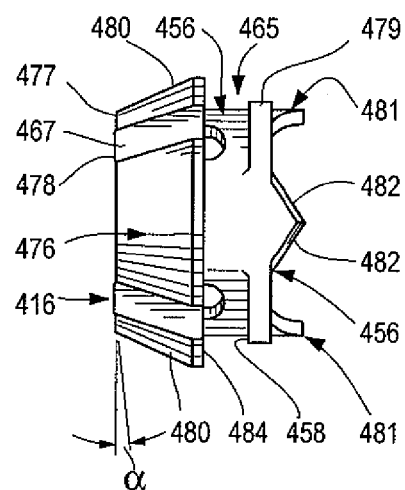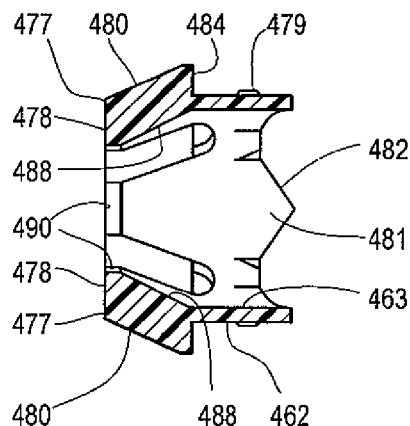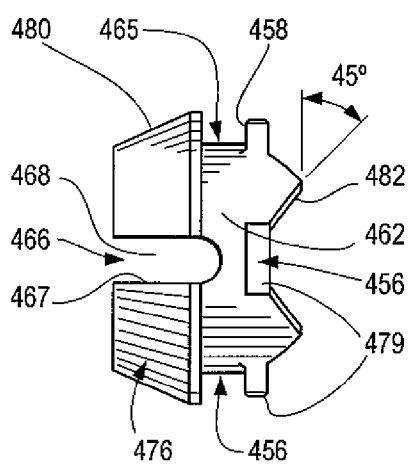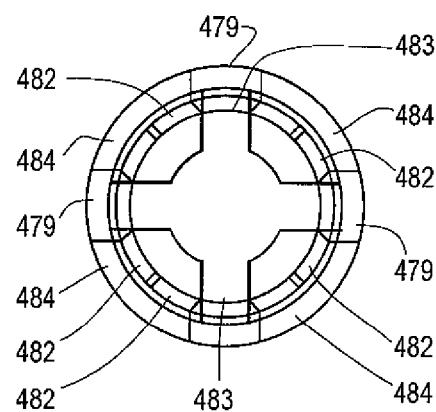

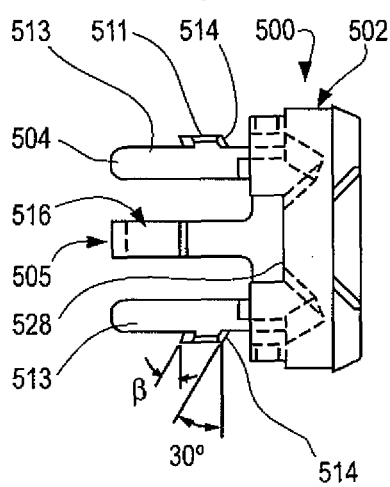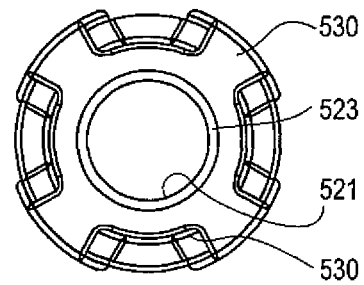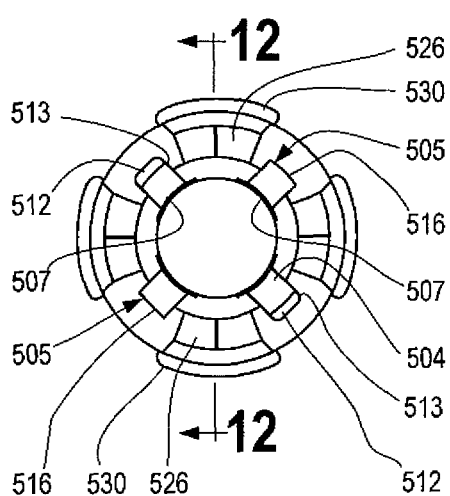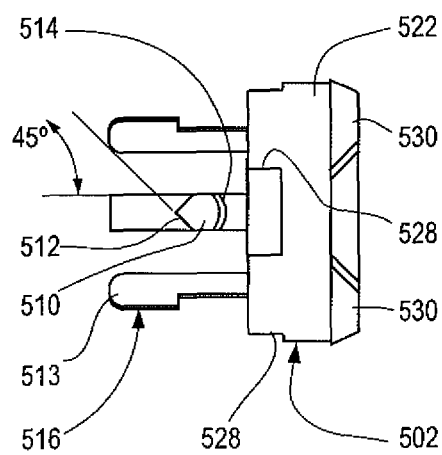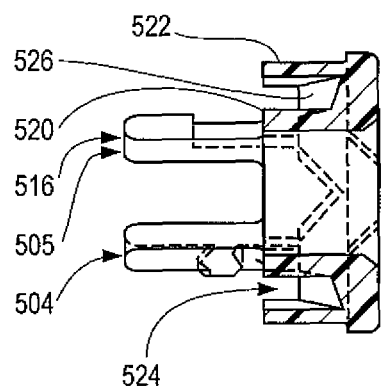

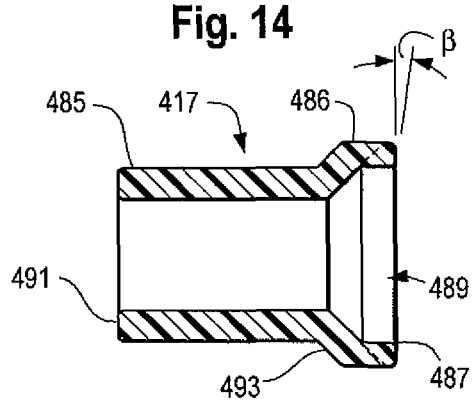
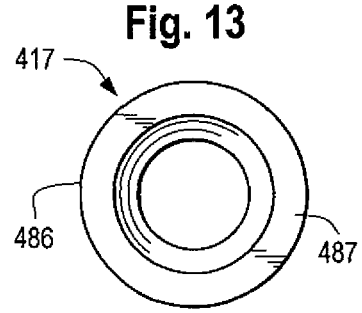
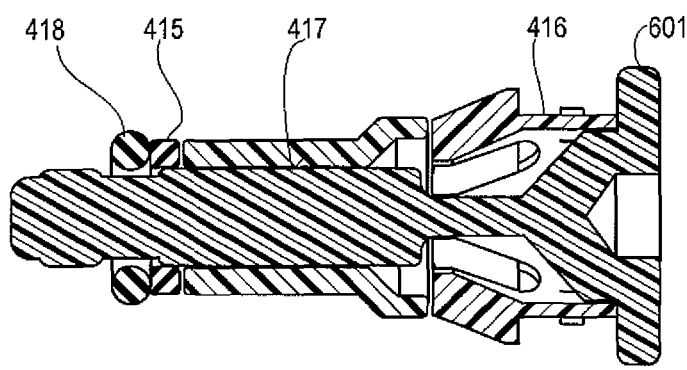

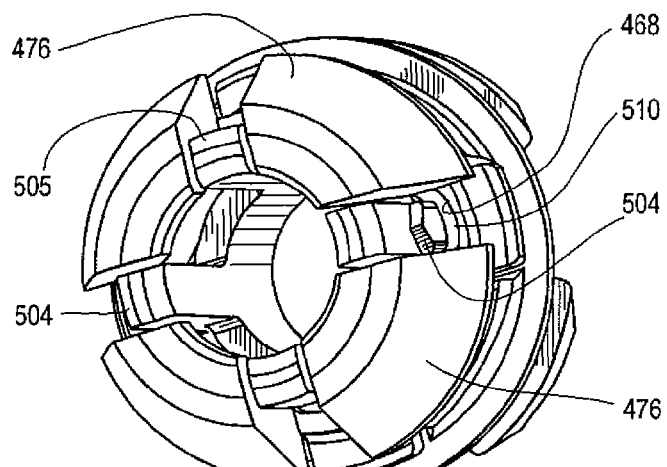
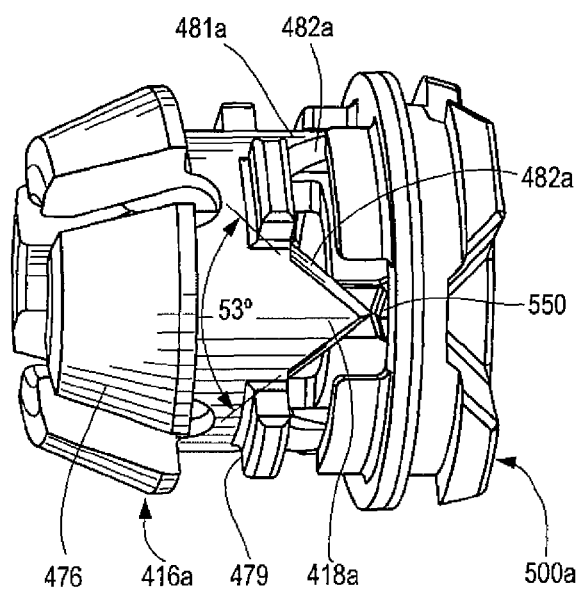
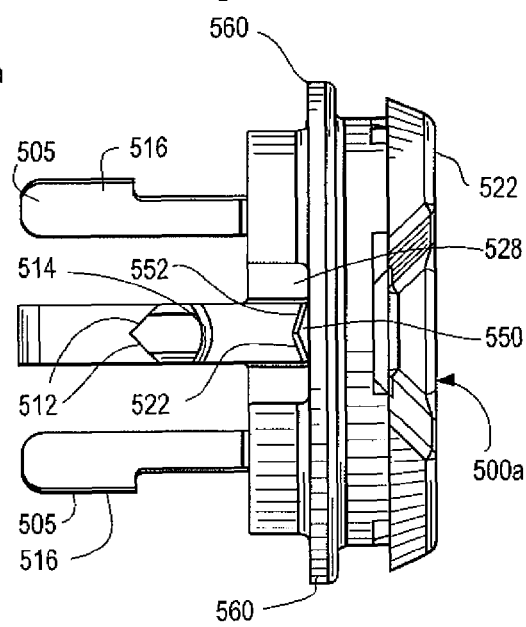

QUICK CONNECTOR FOR HIGH PRESSURE APPLICATIONS

RELATED APPLICATIONS

This application claims priority under 35 USC 119 to provisional application No. 60/895,925 filed Mar. 20, 2007.

BACKGROUND OF THE INVENTION

This application relates to quick connector coupling assemblies for fluid systems, and more particularly to a quick connector for high pressure applications that releasably connects a male member formed at the end of a hollow tube to a hollow connector body.

In the automotive and other fields, a quick connector coupling assembly is often utilized to provide a fluid connection between two components or conduits which generally include a male member, or tube, received and retained in a female connector body. Use of a quick connector is advantageous in that a sealed and secure fluid line may be established with minimum amount of time and expense.

A retainer is often used to secure the male member within the connector body. One such type of retainer includes a plurality of locking members which extend between a radially enlarged upset formed on the male member and an annular face defined in the connector body. The abutment of the retainer with the upset of the male member at one end and the annular face of the connector body at the other end prevents the withdrawal of the male member from the connector body. This type of retainer is prevalent in the art and has proven effective in many fluid line applications.

A seal member, usually in the form of an O-ring seal, is used with a quick connector coupling to create a fluid tight seal between the male member and the connector body. In such a configuration, the O-ring is located axially inwardly of the retainer and separated by an annular spacer slidably mounted on the male member. It is often held against axial load imparted by fluid pressure by a spacer that is press fit, or in a snap fit relation to the bore in which it is received. Since the retainer is somewhat flexible, and the O-ring is slidably linked with the retainer, the O-ring is able to slide slightly relative to the male member. Also, such quick connector assemblies are often used in applications where the components are subject to high temperature or pressure, as well as vibration and cyclic application of pressure. These conditions increase the difficulty of maintaining a fluid tight joint. In high pressure applications such as automotive brake systems, it is necessary to ensure that the axial force imparted to the components be reliably accommodated.

Other known arrangements incorporate a sleeve arrangement to transfer axial load imparted to the seal ring by fluid pressure to the retainer through the upset formed on the male member or tube. In one embodiment, an additional spacer made of Teflon polymer located between the seal member and the sleeve is also used to minimize the effects of vibration and cyclic load.

This invention is directed to an improved sleeve or outer spacer that is configured to transfer axial load imparted by the O-ring seal directly to the locking arms of the retainer. Also disclosed is an improved form of insertion verifier/latch that serves the functions of providing verification of the complete insertion of the male member into the body of the connector assembly, and also provides a latching function to stabilize the locking arms of the tube retainer to suppress inward movement and increase overall burst pressure performance. The insertion verifier/latch also serves to close the entrance into the connector body to minimize entry of contaminants.

BRIEF DESCRIPTION OF THE DRAWINGS

FIG. 3 is a side view of the retainer of the present invention

FIG. 4 is a plan view of the forward end of the retainer of FIG. 3.

FIG. 5 is a side sectional view of the retainer of FIG. 3 taken along the line 5-5 of FIG. 4.

FIG. 6 is a plan view of the rearward end of the retainer of FIG. 3 rotated forty-five degrees (45°) relative to FIG. 4.

FIG. 7 is a side view of the retainer of FIG. 6.

FIG. 8 is a plan view of the rearward end of the insertion verifier of the present invention.

FIG. 9 is a side view of the insertion verifier of FIG. 8.

FIG. 10 is a side view of the insertion verifier of FIG. 8 rotated forty-five degrees (45°) relative to FIG. 9.

FIG. 11 is a plan view of the forward end of the insertion verifier of FIG. 8.

FIG. 12 is a side sectional view of the insertion verifier of FIG. 8 taken along the line 12-12 of FIG. 11.

FIG. 13 is an end view of the outer spacer or sleeve of the quick connector coupling of the present invention showing the rearward end.

FIG. 14 is a side sectional view of the outer spacer of FIG. 13.

FIG. 15 is a sectional side view of a stuffer pin employed with the coupling components of the quick connector coupling of the present invention.

FIG. 16 is a perspective view, in fully assembled relation, of the tube retainer and insertion verifier embodying the present invention.

FIG. 17 is a side perspective of a modified form of the tube retainer and insertion verifier components of the quick connector coupling assembly of the present invention.

FIG. 18 is a side view of the insertion verifier of the assembly of FIG. 17.

DETAILED DESCRIPTION

Figure 1:
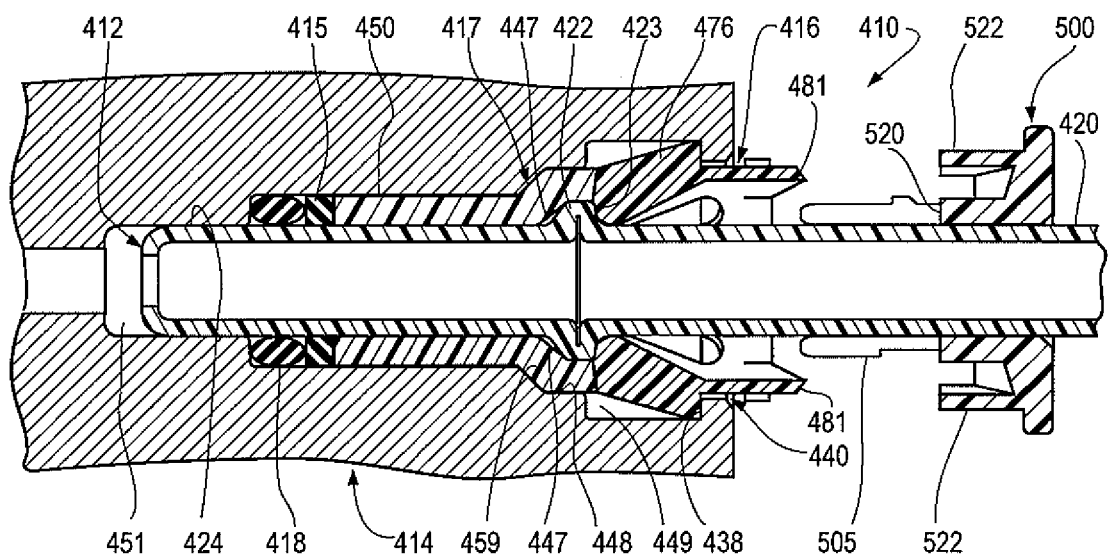
FIG. 1 is a side sectional of the quick connector coupling assembly of the present invention with the tube releasably connected to the body component and the connection verifier positioned on the tube rearward of the tube upset.

The fluid coupling assembly 410 of FIGS. 1-15 is a part of a fluid system. It joins a hollow tube 420 to a fluid system component 414 in fluid tight relation. The tube 420 defines a male member 412 which includes a radially directed annular upset 422 spaced from the free end of the tube. The male member includes an outer cylindrical sealing surface 424 between the tube end and the upset 422.

The coupling assembly includes a retainer 416, a sealing member 418, an inner spacer 415, and an outer spacer or cylinder 417. These components releasably secure the tube male member 412 to a body component 414 in a fluid tight relation.

The component body 414 to which the tube is attached is illustrated here as an "ABS unit" of an automotive brake system. However, the component could be a master cylinder, brake caliper, or other high or low pressure system component. It could also be any form of body defining a cavity or bore to receive the tube end and connection components.

Figure 2:
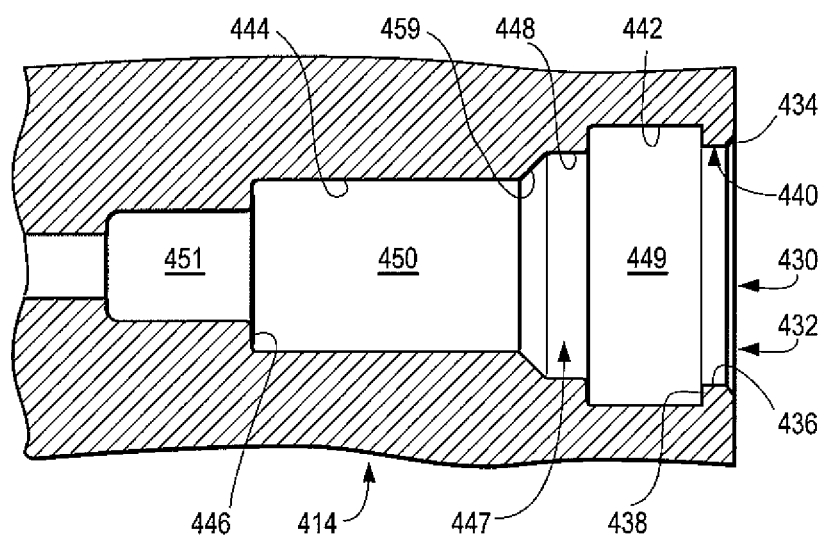
FIG. 2 is a sectional side view of the coupling receiving bore in the system component of the quick connector coupling assembly of FIG. 1.

As seen in FIG. 2, the body component 414 defines a tube, seal, and retainer receiving bore 430. The bore 430 shown in FIG. 2 is divided into four portions which extend axially forward from the entrance opening 432. These are a retainer receiving portion 449, a sleeve or cylinder receiving portion 447, a seal receiving portion 450 and a reduced diameter tube receiving portion 451. The latter portion connects to a fluid passage in communication with the interior of the ABS unit or body component of the fluid system.

The entrance opening 432 is defined by an annular flange or rim 440 with an axial cylindrical surface 436 defining the opening and a forward, radially directed annular abutment, or locking surface 438.

The sleeve receiving portion 447 includes a cylindrical wall 448 of a diameter larger than the cylindrical wall 444 defining the seal receiving portion of the bore and smaller than the diameter of the cylindrical wall 442 defining the retainer receiving portion of the bore 430. A conical surface 459 extends between sleeve receiving portion wall 448 and the wall 444 of the seal receiving portion 450.

The quick connector coupling assemblage of the present invention is seen in cross section in FIG. 1. The cylindrical scaling surface 424 of the male member 412 of tube 420 is positioned in the tube receiving portion 451 of bore 430. The retainer 416 is connected to the annular flange or rim 440 at the entrance opening with locking arms of the retainer extending between the radial abutment surface 438 and the upset 422 formed on the tube 420 to releasably retain the male member portion 412 within the ABS unit or body component 414.

The retainer 416 is best seen in FIGS. 3-7. The retainer 416 includes a cylindrical ring 456 having an outer cylindrical surface 462 and an inner cylindrical surface 463.

The diameter of outer cylindrical surface 462 is somewhat smaller than the diameter of cylindrical surface 436 of rim 440 such that the ring 456 of retainer 416 is loosely piloted therein. The inner diameter 463 of ring 465 is larger than the diameter of upset 422 to permit passage through the ring during insertion of tube 420.

The retainer 416 also includes four axially extending duck bills or locking arms 476 with slots 466 between them. The slots 466 are defined by axially extending side faces 467 that terminate at curved end surfaces 468.

The locking arms 476 of retainer 416 have forward arcuate, generally radial abutment surfaces 478 that abut the tube upset 422 and rearward abutment surfaces 484 that abut locking surface 438 of rim 440 when the retainer 416 is installed into the body component 414.

The locking arms 476 define top ramped surface 480 interior ramped surface 488 and cylindrical bottom surface 490. The locking arms are angled to diverge rearwardly toward rear abutment surfaces 484. On insertion of the male member 412 of the tube 420 into the entrance opening 430 the upset 422 contacts the interior ramped surfaces 488 and deflects the locking arms 476 radially outward to permit passage of the upset forward beyond the front abutment surfaces 478. When the tube is fully inserted, the upset resides forward of the locking arms 478 and the arms return to their normal position with cylindrical bottom surfaces 490 overlying the cylindrical sealing surface 424 of male member 412 rearward of the upset 422. The forward abutment surfaces 478 abut the upset 422.

The arms 476 also include angled arcuate abutment surfaces 477 radially outward of the forward abutment surfaces 478. These angled abutment surfaces are angled in a rearward direction toward ring 456 at an angle α, of five to thirty degrees (5° to 30°) to a plane perpendicular to the longitudinal axis of the retainer 416.

The rearward end of the ring 456 is provided with four radial protrusions 479. Radially inward of each protrusion 479 is a chamfer 483 to guide the insertion verifier.

Intermediate each protrusion 479 is a rearwardly directed guide element 481 defined by two angled surfaces 482 formed at an angle of forty-five degrees (45°) to a plane perpendicular to the longitudinal axis of the retainer 416. The surfaces are thus ninety degrees (90°) to each other and meet at a central apex. The guide surfaces 482 are chamfered to diverge in the forward direction.

Forward faces 458 on protrusions 479 define a channel 465 with the rear abutment surfaces 484. The retainer axial forward movement is limited by the forward faces 458. Channel 465 is sized to receive the rim 440 of the body component 414. The cylindrical surface 436 of the body component overlies the outer cylindrical surface 462.

When assembled to the body, the rim or flange 440 of the body resides radially outward of cylindrical surface 462 of ring 456. The rear abutment surfaces 484 of locking arms 476 abut the radial annular abutment surface 438 of the body 414 and deliver axial loads from fluid pressure to the radial surface 438 of the body component 414.

A seal member, including a seal member, in the form of an O-ring seal 418 surrounds the cylindrical surface 424 of the tube 420 and seals to the body component 414 in the seal receiving portion 450 of bore 430. Inner spacer 415 is positioned rearward of the O-ring 418. It is made of polytetrofluoroethelene (PTFE) and is utilized to reduce effects of vibration and pulsation of pressure on the O-ring seal 418.

The outer spacer 417 of the present invention is positioned between the forward abutment surfaces 478 of the locking arms 476 and the inner spacer 415. Best seen in FIGS. 13 and 14, it is hollow and includes a forward small cylinder portion 485 and a rearward large cylinder portion 486. The large cylinder portion 486 includes a rearward conical annular surface 487 angled to diverge radially and rearward toward the locking arms 478 of retainer 416. The angle β of the surface 487 is five to thirty degrees (5° to 30°) to a plane perpendicular to the longitudinal axis of the cylindrical portions 485 and 486 and is complimentary with the angled surfaces 477 of locking arms 476.

The rearward large cylinder portion 486 defines a tube upset pocket 489. As seen in FIG. 1, when the coupling is assembled, the upset 422 of the tube 420 resides in the tube upset pocket 489. That is, the inner diameter of the large cylinder portion 486 is larger than the outer diameter of the upset 422.

In the assemblage shown in FIG. 1, the small cylinder portion 485 resides in the seal receiving portion 450 of the bore 430 and the large cylinder portion 486 resides in the sleeve or cylinder receiving portion 447 of bore 430. The outer spacer 417 slides into the cavity or bore 430 of the ABS unit 414 with the small cylinder portion received in the seal receiving portion 450 and the large cylinder portion received in the sleeve receiving portion 447.

The annular radial forward end 491 of the small cylinder portion 485 and radial annular wall 446 between the seal receiving portion 450 and tube receiving portion 451 of the bore 430 define the seal pocket or gland area where the O-ring 418 and inner spacer 415 reside.

The axial forward position of the sleeve or outer spacer 417 is set by contact of annular surface 493 between the small cylinder portion 485 and the large cylinder portion 486 with the conical surface 459 in the bore 430 between the sleeve receiving portion 447 and the seal receiving portion 450 of the bore. This relationship keeps the axial length of the O-ring gland from reducing and overstressing the O-ring.

The outer spacer 417 of the invention is molded out of plastic or machined from metal. It transfers the fluid pressure load on the O-ring 418 to the angled abutment surfaces 477 on locking arms 476 through contact with complementary angled surface 487 on large cylindrical portion 486.

The large cylinder portion 486 of the outer spacer eliminates outer spacer contact with the male tube upset 422 which moves the O-ring fluid pressure force from the front abutment surfaces 478 of locking arms 476 to angled abutment surfaces 477 radially outward of the front abutment surfaces 478. Moving the force outward and adding the angled abutment surfaces 477 to the retainer 416 reduces axial compressive stresses on the retainer locking arms 476 to improve impulse fatigue capability.

The angled abutment surface 477 of the retainer locking arms 476 and angled surface 487 of large outer spacer cylinder portion 486 create an inward tightening force on retainer locking arms 476 to force cylindrical bottom surfaces 490 onto the outer cylindrical surface 424 of the tube rearward of the tube upset 422. This clamping force prevents tube-to-retainer disengagement during pressure impulses or side loading or any other force acting on the tube 420. Since the axial force of the O-ring fluid pressure is contacting a larger surface on the locking arms, the compressive stress will be smaller, thus increasing impulse fatigue capability. The angled mating surfaces 477 and 487 also transmit a slightly reduced compressive axial force to the retainer locking arms 476 which increases impulse fatigue capability of the retainer locking arms 476.

With the present invention, the outer spacer rearward angled surface 487 abuts the angled abutment surfaces 477 of the retainer locking arms 476 instead of the tube upset 422. This relationship keeps the outer spacer 417 in correct axial position to keep the seal pack of inner spacer 415 and O-ring 418 in position even after many cycles of temperature and vibration.

This arrangement also eliminates field issues, in particular, during service procedures. Disengagement of tube will not permit seal pack to fall out since the large cylinder portion 486 on the outer spacer 417 will abut the forward abutment surfaces 478 of the retainer locking arms 476 even in the release position where the locking arms are urged radially outward by a release tool to permit the upset 422 to be withdrawn. This relationship ensures that the sleeve 417 remains in place in bore 430 blocking inadvertent removal of inner spacer 415 and O-ring 418.

The O-ring 418 is located such that the tube free end contacts the O-ring 418 simultaneously with the tube upset 422 contacting the ramped inner surfaces 488 of retainer locking arms 476. This axial component positioning gives the operator a consistent increasing resisting force during insertion. This resistance force drops off quickly after the mating tube upset 422 is inserted beyond the locking arms 476.

As mentioned above, the retainer locking arms 476 each have an angled abutment face 477 on the forward abutment surface of the duck bill that abuts the outer spacer conical angled surface 487.

The retainer angled abutment faces 477 were created by adding material to the radial outer portion of the locking arms 476. As compared to a retainer with locking arms such as arms 476 that include forward abutment surfaces such as surfaces 478 that abut only the rearward facing radial annular surface 423 of upset 422 of tube 420. That is, the top ramped surface 480 of locking arms 476 is radially outward of the outer diameter of the tube upset by the radial extent of the angled abutment surfaces 477 of the locking members 476. The junction between the radial locking surfaces 478 that abut the radial annular surface 423 of the upset 422 of tube 420 and the angled abutment surfaces 477 that abut the conical surface 489 of sleeve 417 is slightly radially outward of the outer perimeter or outer diameter of the upset 422. This added material to the locking arms creates more abutment surface area to absorb compressive forces created by fluid pressure on O-ring 418 and fluid pressure acting on the end of tube 420.

For an exemplary coupling assembly 410 having a tube 420 with an outer diameter of 0.375 inches, the total area of tube upset abutment surfaces 477 and 478 is 15.96 mm sq. (4 locking arms×3.99 mm sq.) to handle axial O-ring and tube forces. The surface area tube upset abutment surfaces 478 is 10.80 mm sq. (4 locking arms×2.70 mm sq.) to handle the tube force. The surface area of angled abutment surfaces 477 is 35.76 mm sq. to handle O-ring force.

The retainer 416 of this embodiment has 26.76 mm sq. of duck bill abutment surface area that mates with radial abutment surface 438 of the body component. This increases total area at both duck bill contact points for greater performance at high fluid pressures.

In this latter discussion, the term "mm sq." means square millimeters of area.

The quick connector coupling of the present invention also includes an insertion verifier 500 shown in detail in FIGS. 8-12. It functions somewhat similarly to the secondary latch disclosed in U.S. Pat. No. 6,173,994 in that it includes legs that slide into the slots between the locking arms of the retainer. The legs are sized such that the insertion verifier can only be fully inserted if the tube upset is fully inserted and latched, forward of the forward abutment surfaces 478 of the retainer locking arms 476.

The insertion verifier 500 includes ring 502 having radially inner annular axial wall 520 and a radially outer annular axial wall 522 connected by a rearward radial axial wall. The radially inner wall 520 has an inner surface 521 having a diameter slightly larger than the outer cylindrical surface 424 of male member 412 to permit it to slide axially on the tube 420. An entrance chamfer 434 aids in inserting free end of tube 420 into bore 521.

The radially outer annular wall 522 defines with wall 520 a hollow annular space 524 closed by rearward radial annular wall. The rearward most terminus of the annular space 524 is defined by angled wall surfaces 526 that are complementary to the angled surfaces 482 of guide elements 481. That is, the wall surfaces 526 are at an angle of ninety degrees (90°) to each other and at an angle of forty-five degrees (45°) to a plane perpendicular to the longitudinal axis of the insertion verifier.

The angled wall surfaces 526 define four pockets to receive the four guide elements 481. The rearward end of retainer ring 456 resides in the annular space 524 when the guide members 481 are disposed in the pockets formed by walls 526. Outer annular wall 522 includes four notches 528 to receive the radial protrusions 479 that are extant at the rearward end of the retainer ring 456.

Four radial lips 530 extend from rearward end of outer ring 522. These lips are useful in manually retracting the insertion verifier from its inserted position. Such retraction is necessary in order to insert a removal tool into the entrance opening 430 to spread the locking members 476 and permit withdrawal of upset 422 from its latched position in the upset pocket 489.

Insertion verifier 500 resides on tube 420 rearward of upset 422. It is therefore, a component that must be assembled and shipped with the tube. The tube upset 422 prevents it from being accidentally removed.

The tube 420 may be connected to the connector coupling body 414 and the retainer 416 using the connection verifier 500. As explained below, the insertion verifier is employed during the insertion process to axially insert the tube male member 420 into the body component 414 and secure the upset 422 forward of the forward abutment surfaces 478 of locking arms 476.

The insertion verifier 500 includes four axially extending legs that extend forward of the wall 520 of ring 502. The verifier includes two legs 504 spaced one hundred eighty degrees (180°) apart and two legs 505 spaced one hundred eighty degrees (180°) apart. These pairs of legs are disposed equally spaced about ring 502. The radially inner-arcuate surfaces 507 of the legs are formed on about the same diameter as the inner diameter of inner surface 521 of inner wall 520 of ring 502 and thus slide freely on cylindrical surface 424 of tube male member 412.

The legs 504 and 505 include radially directed axially extending side walls 513 and have a lateral or circumferential width sized to fit into the slots 466 between the side faces 467 locking arms 476 of the retainer 416. Such positioning is possible only if the male member 412 defined by tube 420 is fully inserted into the coupling body cavity or bore 430, with the tube upset 422 disposed forward of the forward abutment surfaces 478 of the locking arms 476 in the upset pocket 489 defined by the large diameter portion 486 of the sleeve or outer spacer 417. When so positioned, the legs can be fully inserted axially between the locking arms 476 because axial forward movement is limited by the position of the upset 422. When fully inserted, the legs 504 and 505 fill the slots 466 and prevent collapse of the locking arms 476 of retainer 416 toward the outer cylindrical surface 424 of tube 420. This relationship provides added strength and durability to the connection. This interrelationship is best seen in FIG. 16. There the legs 504 and 505 of the insertion verifier 500 are fully inserted into the slots between the retainer locking arms 476. The volume occupied by the legs 504 and 505 within the slots 466 provides stability to prevent accidental disconnection of the locking arms even in vibratory conditions.

It has been found that the retainer locking arms 478 unfold from the outside, in, during burst testing. It has been found that the burst pressure value will increase with the addition of the insertion verifier with its legs in the slots which will keep the unfolding motion from progressing. The faces 467 of the locking arms defining slots 466 squeeze together during burst unfolding so the presence of the insertion verifier legs restrict this movement and increase failure pressure.

Two of the legs 504 include radially outwardly directed pads 510. Pads 510 include a forward rotational guide 511. Each guide 511 is defined by two guide surfaces 512 that forwardly converge meet at an apex midway between the side walls 513 of the legs 504 and extend rearwardly from the point at an angle of forty five degrees (45°) to the axial side walls 513 of the legs 504, i.e. ninety degrees (90°) to each other. The guide surfaces 512 have a forward pitch or angle β to be complementary to the chamfers on the guide surfaces 482 on the guide elements 481. On axial insertion of the insertion verifier along tube 420 contact of the guide surfaces 512 with angled surfaces 482 of guide elements 481 results in rotation of the retainer 416 to align legs 504 and 505 of insertion verifier with chamfers 483 to align the legs with slots 466 and permit the legs to pass into the slots 466 between the side surfaces 467 of locking arms 476.

The rearward end of each pad 510 includes a latching surface 514. On full insertion of legs 504 between locking arms 476, the latching surfaces 514 catch the end surfaces 468 defining the rearward terminus of the slots 466 to releasably secure the verifier 500 to the retainer 416. These latching surfaces are sloped rearward. They are arranged to catch on surfaces 468 to hold the verifier 500 in the assembled coupling. However, the slope, of thirty degrees (30°) to a plane perpendicular to the longitudinal axis of the verifier 500 permits these surfaces to be unlatched on physical effort to pull the verifier axially rearward.

The other two legs 505 of the verifier 500, those not provided with pads 510, each include a radially extended block portion 516. The blocks 516 on legs 505 are located adjacent the distal end of the legs and extend rearwardly and terminate at about the same axial position as the point formed by guide surfaces 512 on pads 510 of legs 504. This block portion adds bulk to the legs and fills the volume of the slot 466 into which leg 505 is inserted to further enhance the latching strength of the assemblage. The added mass of legs 505 provided by blocks 516 aids in insertion of the tube male member 412 into bore 430 when the insertion verifier 500 is employed for that function by applying axial force to the verifier ring 502.

It should be noted that the radial thickness of the legs 505 at blocks 516 is about the same as the radial thickness of legs 504 rearward and forward of the pads 510. At the pads 510, the radial thickness of legs 504 exceeds the radial thickness of the legs 505 at blocks 516. The pads 510 on legs 504 are located about midway between the distal end of the leg and its connection to annular ring 502. The radial thickness of legs 505 between blocks 516 and the connection of legs 505 to inner annular wall 520 is about half the radial thickness of the legs 504, or the thickness of the legs 505 at blocks 516. Thus, the outer surface of the legs 505 between the blocks 516 and the connection to annular wall 520 creates a void or open space to permit deflection of the annular ring 456 of retainer 416 radially inwardly during insertion and removal of the legs 504 and 505 of insertion verifier 500.

The insertion verifier 500 is assembled by sliding insertion verifier axially on tube 420 so the guide surfaces 512 of pads 510 contact the retainer guide elements 481 creating a rotation of the retainer 416 that aligns the legs 504 and 505 with the slots 466. During assembly, the insertion verifier pads 510 will expand, or deform the annular ring 456 of the retainer 414 outward until the rear latching surfaces 514 move past the forward surfaces 468 between the retainer locking arms 476 and lock in place. At the same time, the retainer ring 456 will bow inward ninety degrees (90°) from the contacted points during insertion verifier assembly. As previously described, the relative thickness of the legs 505 between the blocks 516 and connection of the legs to inner annular wall 520 permits such radially inward distortion of retainer ring 456.

The assembled relationship of verifier and retainer is best illustrated in FIG. 17. When so positioned the legs 504 and 505 of verifier 500 prevent the duck bill locking arms 476 from flexing radially inward, adding to the overall resistance to unintentional unlatching of the retainer 416 from rim 440 of the bore 430.

The length and width of the four insertion verifier legs are selected so that the legs fit in slots 466 between side faces 467 of retainer locking arms 476 so the legs 504 and 505 will contact the tube upset and propel the tube upset past the retainer locking arms before the latching surfaces 514 latch onto surfaces 468 in slots 466 of retainer 416. Full insertion of the tube end is accomplished by axially moving the verifier 500 forward.

The legs 504 and 505 contact upset 422 and urge it toward, and beyond, the retainer locking arms with the forward locking surfaces 478 disposed in abutting relation to the upset 422. The upset resides in the upset pocket 489 formed by the large diameter cylinder portion 486 of outer spacer 417. The legs 504 and 505 of the verifier 500 reside in slots 466 with latching surfaces 514 latched to rearward surfaces 468 of retainer 416. With insertion verifier fully locked into the retainer, the primary latching of tube upset to retainer is guaranteed. Once the insertion verifier is fully assembled its close fit to the retainer will keep debris and contaminants from getting inside the connector to improve serviceability. To service, verifier radial lips 530 on the outside diameter that can be gripped manually to pull insertion verifier rearward axially along tube 420 and out of the retainer 416. The ring 456 of retainer 416 will deform at the two contacts with the pads 510 radially outward at two places one hundred eighty degrees (180°) apart. Such deformation permits the latching surfaces 514 to disengage from the surfaces 468 and withdrawal of the retainer legs 504 and 505 from slots 466.

A stuffer pin 601 illustrated in FIG. 15 is used to assemble quick connector components into a system component receiving bore such as bore 430. Stuffer pins are made of plastic while the receiving component is usually made out of metal for high pressure brake or power steering applications and usually plastic for low pressure applications such as liquid fuel or fuel vapor. The retainer 416, outer sleeve, 417, seal member 418, and inner spacer 415 are preassembled onto stuffer pin 601. A removable protective cap is provided which protects these components prior to installation. To assemble the components into a body component 414 the protective cap is removed and discarded.

The stuffer pin is used to insert these components into the body component 414. The body component is thus pre-loaded with the coupling components to receive and secure the male member 412 of the tube 420. The stuffer pin 601 contains appropriately formed grooves and cylinders to hold the components in place during shipping. The stuffer pin grooves and cylinders also allow insertion and retraction of stuffer pin into a receiving bore of a system body component so that the retainer and sealing components are assembled in correct positions without incurring any damage or misalignment.

The retainer 416 and outer spacer 417 of the present invention hold the O-ring 418 and inner spacer 415 inside the receiving bore 430 during stuffer pin retraction in the same manner as it retains those components in place during removal of a previously coupled tube 420. The contact of angled surface 487 of outer spacer 417 with angled abutment surfaces 478 prevents accidental dislodgement or removal because retainer 416 is secured to rim 440 of the body component 414.

Outer spacers are part of the "seal pack" used in all quick connectors. The "seal pack" consists of an O-ring and spacers that encompass the outside diameter of mating tube. The compression of the O-rings to the tube creates the seal while the inner spacer creates the shoulder of the gland area where the O-ring resides. The outer spacer is the last component of the "seal pack" to be assembled and it therefore must keep the O-ring from blowing out when fluid pressure is applied. Past designs utilize a light press fit or a shoulder snap fit to resist the fluid pressure. Fuel applications with the interference snap fit hold up to 150 psi while transmission oil cooler applications utilize a press fit which holds up to 300 psi. In the arrangement of the present invention the connection of the retainer 416 to the rim 440 receives this load and performs the function of holding the outer spacer 417 in its proper position even at the high pressures experienced in brake system applications.

Turning to FIGS. 17 and 18, a retainer 416*a* and an insertion verifier 500*a* are illustrated with modification as described below.

In FIG. 17, a somewhat modified form of guide element 481*a* is illustrated. The angled surfaces 482*a* of each guide element 481*a* are at a greater angle, to each other, here 53°. This relationship results in the guide elements 481*a* being longer in the axial direction than the guide elements 481 of FIGS. 1-16. The guide surfaces 482*a* therefore impart a greater relative rotational component to the insertion verifier 500*a* on insertion into the retainer.

Best seen in FIG. 18, an insertion verifier 500*a* is shown which is modified somewhat from the insertion verifier 500 of FIGS. 1-16. It includes a forwardly directed guide element 550 aligned with each of the legs 504 and 505. It is formed by two angled surfaces 552 at an angle of 12½° to a plane perpendicular to the axial extent of a verifier 500*a* and meet at an apex. These surfaces are positioned in alignment with the legs and are intended to impart a relative rotational force component to the insertion verifier in the event the legs 504 and 505 are not aligned with the slots 466 of the retainer 416 and the guide elements 481 of the guide elements 481 somehow override the guide surfaces 512 on pads 510.

If the verifier and retainer are misaligned during insertion of the verifier, the legs 504 and 505 will align with the locking arms 476. The legs will contact the interior ramped surfaces 488 and urge the free ends of the locking arms radially outwardly, away from the tube surface 424. The axial length of guide elements 440 is such that the apex of each guide element contacts the rearward radial annular wall before the legs 504 and 505 lift the locking arms 476 sufficiently to permit passage of the upset 422 rearwardly. This relationship prevents the misaligned insertion verifier from inadvertently releasing the tube from the assembly.

Insertion verifier 500*a* also includes a radial outwardly directed rim 560 immediately rearward of notches 528 in outer annular wall 522. This rim is intended to deter attempts to remove the insertion verifier with a tool not intended for that purpose. When the insertion verifier 500*a* is inserted into a coupling assembly the rim 560 is spaced from the surface at entrance opening of bore 430 in body component 414. This relationship deters use of tools such as wrenches to remove the insertion verifier.

Various features of the prior art have been described with reference to the above illustrative embodiments. It should be understood that modifications may be made without departing from the spirit and scope of the invention.

I claim:

1. A fluid coupling assembly comprising:
    a connector body defining a bore extending axially from an entrance opening defined by a radially inward extending rim having an axial cylindrical surface, said bore having a retainer receiving portion adjacent said rim and a sealing member receiving portion forward of said retainer receiving portion and a tube receiving portion forward of said seal member receiving portion;
    a retainer releasably secured to said rim of said connector body, said retainer including a plurality of axially extending radially deflectable locking arms in said retainer receiving portion of said bore, each said locking arm including a rearward abutment surface and a forward abutment surface, said rear abutment surfaces in abutting contact with said rim;
    a hollow tube, removably received within said bore having a cylindrical surface extending from a free end of said tube disposed in said tube receiving portion and a radially outwardly directed upset spaced from said free end, said forward abutment surface of each of said locking arms in abutting contact with said upset;
    wherein said retainer includes a cylindrical ring having an outer cylindrical surface and an inner cylindrical surface, a diameter of said outer cylindrical surface being smaller than a diameter of said axial cylindrical surface of said rim, said rim of said connector body is disposed radially outward of said cylindrical ring, and said locking arms extend from said cylindrical ring into said retainer receiving portion, said locking arms include side faces defining slots said slots having end surfaces on said retainer defining a rearward terminus of said slots;

wherein said cylindrical ring of said retainer includes a plurality of radial protrusions defining a channel with said rearward abutment surfaces of said locking arms and said rim is disposed in said channel; and wherein said cylindrical ring of said retainer defines a rearwardly directed guide element intermediate each said protrusion, each said guide element is defined by two angled rearwardly converging surfaces that meet at a separate apex intermediate adjacent protrusions;

an insertion verifier, said insertion verifier includes a ring disposed outward of said upset and four forwardly extending legs extending from said ring of said insertion verifier, each of said four legs having radially directed axially extending sidewalls and a distal end, each of said four legs disposed in a respective one of said slots defined by said side faces of said locking arms, two of said four legs two of said legs including a radially outward directed pad defining a forwardly directed guide defined by two angled guide surfaces rearward of said distal end of each of said to leg converging forwardly and meeting at an apex midway between said sidewalls of each of said two legs to engage said angled rearwardly converging surfaces of said rearwardly directed guide elements of said cylindrical ring of said retainer;

wherein each said radially outwardly directed pad is disposed in a respective one of said slots defined by said side faces of said locking arms, is spaced from the distal end of each of said two legs toward said ring of said insertion verifier, and has a rearward end defining a latching surface releasably engaging the rearward terminus of one of said slots, and wherein another two of said four legs of said insertion verifier each having a radially extending block extending from the distal end of each of said another two legs toward said ring of said insertion verifier, each said block disposed in a respective one of said slots defined by said side faces of said locking arms;

wherein each of said four legs fill a respective one of said slots and prevent collapse of said locking arms of said retainer toward said cylindrical surface of said tube.

2. A fluid coupling assembly as claimed in claim 1 wherein said ring of said insertion verifier includes a radially inner annular wall and a radially outer annular wall connected by a rearward radial annular wall, said four legs extending axially forwardly from said radially inner annular wall, said rearward radial annular wall including angled wall surfaces which are complementary to said two angled rearwardly converging surfaces of said rearwardly directed guide elements of said retainer and define pockets receiving said rearwardly directed guide elements.

3. A fluid coupling assembly as claimed in claim 1 wherein said two legs of said insertion verifier having said radially outward directed pad defining said latching surface are disposed in diametrically opposed relation, and said another two legs having said radially extending block are disposed in diametrically opposed relation.

4. A fluid coupling assembly as claimed in claim 3 wherein, said ring of said insertion verifier includes a radially inner annular wall and a radially outer annular wall connected by a rearward radial annular wall, said four legs extending axially forwardly from said radially inner annular wall, said rearward radial annular wall including angled wall surfaces which are complementary to said two angled rearwardly converging surfaces of said rearwardly directed guide elements of said retainer and define pockets receiving said rearwardly directed guide elements.

5. A fluid coupling assembly as claimed in claim 4 wherein said ring of said insertion verifier includes an inner cylindrical surface slidable on said tube, rearward of said upset, and said cylindrical ring of said retainer said radially outer annular wall of said ring of said insertion verifier includes notches, said radial protrusions on said cylindrical ring of said retainer disposed.

6. A fluid coupling assembly as claimed in claim 5 wherein said radially outer annular wall of said ring of said insertion verifier includes a radially outwardly directed annular rim rearward of said notches.

7. A fluid coupling as claimed in claim 6 wherein said radially outer annular wall of said ring of said insertion verifier includes a plurality of radial lips rearward of said radially outwardly directed annular rim.

8. A fluid coupling assembly as claimed in claim 5 wherein said rearward radial annular wall of said ring of said insertion verifier includes forwardly directed guide elements aligned with each said four legs, and said forwardly directed guide elements are defined by angled surfaces, said angled surfaces converging forwardly and meeting at an apex.

* * * * *

UNITED STATES PATENT AND TRADEMARK OFFICE
CERTIFICATE OF CORRECTION

PATENT NO.         : 8,939,470 B2
APPLICATION NO.    : 12/048947
DATED              : January 27, 2015
INVENTOR(S)        : Stephen H. Gunderson Page 1 of 1

It is certified that error appears in the above-identified patent and that said Letters Patent is hereby corrected as shown below:

In the Claims

Claim 1 at column 11, line 23, "said four legs two of said legs including" – should read
-- said four legs including --.

Claim 1 at column 11, line 26, "distal end of each of said to leg converging" – should read
-- distal end of each of said two legs converging --.

Signed and Sealed this
Thirtieth Day of June, 2015

Michelle K. Lee
*Director of the United States Patent and Trademark Office*